United States Patent
Sekiya et al.

(10) Patent No.: US 6,580,874 B1
(45) Date of Patent: Jun. 17, 2003

(54) FIELD CURRENT CONTROL METHOD IN MOTOR

(75) Inventors: Shigenobu Sekiya, Saitama (JP); Hisao Asaumi, Saitama (JP); Takashi Kuribayashi, Saitama (JP); Kouji Tsuchiya, Saitama (JP)

(73) Assignee: Honda Giken Kabushiki Kaisha, Tokyo (JP)

( * ) Notice: Subject to any disclaimer, the term of this patent is extended or adjusted under 35 U.S.C. 154(b) by 50 days.

(21) Appl. No.: 09/604,327

(22) Filed: Jun. 27, 2000

(30) Foreign Application Priority Data

Jun. 29, 1999 (JP) ............................................. 11-184160

(51) Int. Cl.[7] .............................. H22P 7/06; B60K 17/34
(52) U.S. Cl. ....................... 388/806; 388/801; 388/803; 318/244
(58) Field of Search .............................. 318/244, 245, 318/251, 252; 388/801, 803, 806, 826

(56) References Cited

U.S. PATENT DOCUMENTS

| | | | | |
|---|---|---|---|---|
| 3,183,427 A | * | 5/1965 | Hawkins et al. | |
| 3,193,698 A | * | 7/1965 | Henderson et al. | |
| 3,828,235 A | * | 8/1974 | Price et al. | |
| 3,911,342 A | * | 10/1975 | Herwig | |
| 3,967,175 A | * | 6/1976 | Turley | |
| 5,039,924 A | * | 8/1991 | Avitan | |
| 5,070,283 A | * | 12/1991 | Avitan | |
| 5,264,763 A | * | 11/1993 | Avitan | |
| 5,349,279 A | * | 9/1994 | Avitan | |
| 5,585,706 A | * | 12/1996 | Avitan | |
| 5,903,130 A | * | 5/1999 | Rice et al. | |
| 6,021,251 A | * | 2/2000 | Hammer et al. | |
| 6,153,942 A | * | 11/2000 | Roseman et al. | |

FOREIGN PATENT DOCUMENTS

| EP | 456-344 A1 | * | 3/1991 |
|---|---|---|---|
| EP | 456-345 A1 | * | 11/1991 |

\* cited by examiner

*Primary Examiner*—Bentsu Ro
(74) *Attorney, Agent, or Firm*—Sughrue Mion, PLLC

(57) ABSTRACT

In separately excited DC brush motors ML and MR, an armature current control circuit for feeding power to armatures 61 and a field current control circuit for feeding power to a field system 62 form separate systems and are independently controllable except that both the control circuits share a battery B2 between them. When the overrotation of the motors ML and MR is detected from the backflow of an armature current and a rise in the voltage of the battery B2 or when the reverse rotation of the motors ML and MR is detected from an increase in the armature current and a decrease in PWM for the armature current, the generation of counter electromotive force is restrained by reducing the field current of the motors ML and MR so as to prevent the armature current control circuit from being damaged.

10 Claims, 12 Drawing Sheets

ARMATURE CURRENT CONTROL CIRCUIT

FIELD CURRENT CONTROL CIRCUIT

FIELD CURRENT CONTROL METHOD IN MOTOR

BACKGROUND OF THE INVENTION

1. Field of the Invention

This invention relates to a separately excited DC brush motor wherein a field and an armature current can be controlled separately, and more particularly to a field current control method when the overrotation or reverse rotation of motors is detected.

2. Description of the Related Art

FIG. 7 shows a separately excited DC brush motor and its control circuits. An armature current control circuit for feeding power to the armatures 61 of motors ML and MR, and a field current control circuit for feeding power to a field system 62 form separate systems and are independently controllable except that both the control circuits share a battery B2 between them. The armature current control circuit includes a capacitor 63, a diode 64, one FET 65, an armature current sensor 66a, and a battery voltage sensor 66b, the armature current being turned on electricity in only one direction. The field current control circuit includes a capacitor 67, four FETs 68 . . . , and a field current sensor 69. And the field current control circuit is capable of varying the direction of the field current (the direction of magnetic flux of the field system) and the intensity of the field current (intensity of the magnetic flux of the field system) by controlling the four FETs 68 . . . under PWM control.

SUMMARY OF THE INVENTION

When front wheels of a front-and-rear wheel drive vehicle are driven by an engine with the rear wheels driven by separately excited brush motors ML and MR, the motors ML and MR may be overrotated or reversely rotated by the driving force reversely transmitted from the rear wheels. When the motors ML and MR are overrotated, the motors ML and MR function as generators for generating a voltage higher than the voltage of the battery and this may result in damaging the current control elements of armature current control circuits connected to the armatures 61 of the motors ML and MR. In a case where the dielectric strength of the armature current control circuits is increased in order to prevent such damage, there arises a problem of increasing costs. Even when the motors ML and MR are reversely rotated, the motors ML and MR that function as generators allow an excessive current to flow into the diode 64 even when the FET 65 of the armature current control circuit is turned off. In a case where the current capacitance and heat radiability of the diode 64 are increased, there also develops a problem of increasing costs.

An object of the present invention made in view of the situation above is to prevent an armature current control circuit from being damaged when motors are overrotated or reversely rotated by the driving force transmitted from a driven portion.

In order to accomplish the object, according to the invention in a first aspect of this invention, proposed is a field current control method in motors such as a separately excited DC brush motor wherein a field current and an armature current are separately controllable. Also the method comprises the step of reducing the field current when overrotation or reverse rotation of motors is detected.

With the arrangement above, since the field current is reduced when the overrotation and reverse rotation of the motors is detected, the motors are prevented from functioning as generators for generating an excessive current and an excessive voltage, whereby the armature current control circuit of the motors can be prevented from being damaged without particularly increasing the dielectric strength and current capacitance.

According to the invention in a second aspect of this invention, proposed is, in addition to the arrangement in the first aspect, a field current control method has feature that the overrotation is detected from a rise in the voltage of a battery for feeding power to motors.

With the arrangement above, since the overrotation of the motors is detected from a rise in the voltage of the battery for feeding power to the motors, the overrotation can be detected exactly without providing a sensor for detecting the number of rotations of the motors.

According to the invention in a third aspect of this invention, proposed is, in addition to the arrangement in the first aspect, a field current control method by which the overrotation is detected from backward flow of the armature current of the motors.

With the arrangement above, since the overrotation of the motors is detected from the backward flow of the armature current of the motors, the overrotation can be detected exactly without providing a sensor for detecting the number of rotations of the motors.

According to the invention in a fourth aspect of this invention, proposed is, in addition to the arrangement in the first aspect, a field current control method by which the reverse rotation is detected according to the actually measured value of the armature current or the PWM value of the armature current of the motors.

With the arrangement above, since the reverse rotation of the motors is detected according to the actually measured value of the armature current or the PWM value of the armature current of the motors, the overrotation can be detected exactly without providing a sensor for detecting the number of rotations of the motors.

DETAILED DESCRIPTION OF THE PREFERRED EMBODIMENT

A mode for carrying out the invention will now be described according to an embodiment thereof shown in the accompanying drawings.

Figure 1:
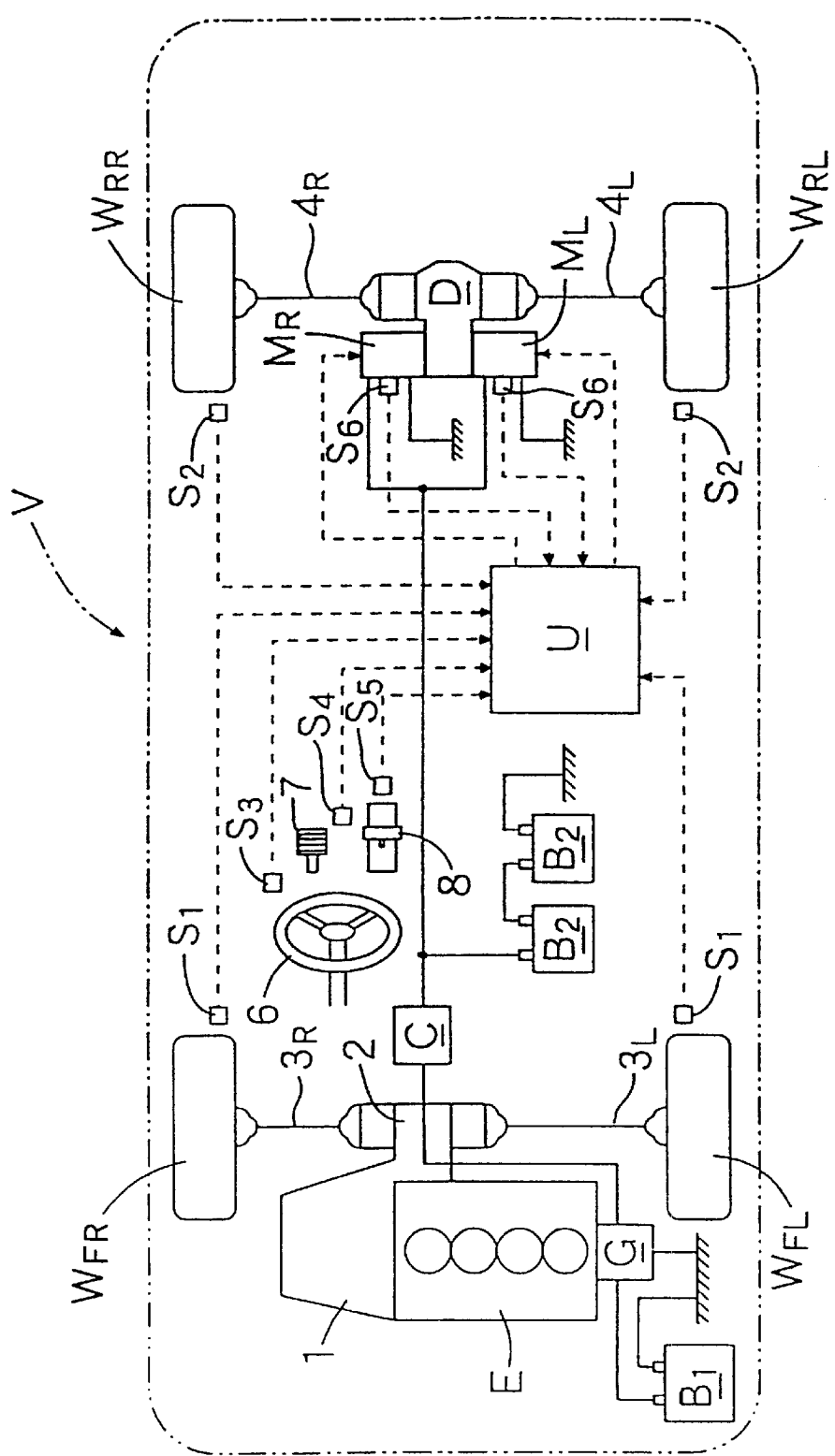
FIG. 1 is a diagram illustrating the overall construction of a front-and-rear wheel drive vehicle.
Figure 2:
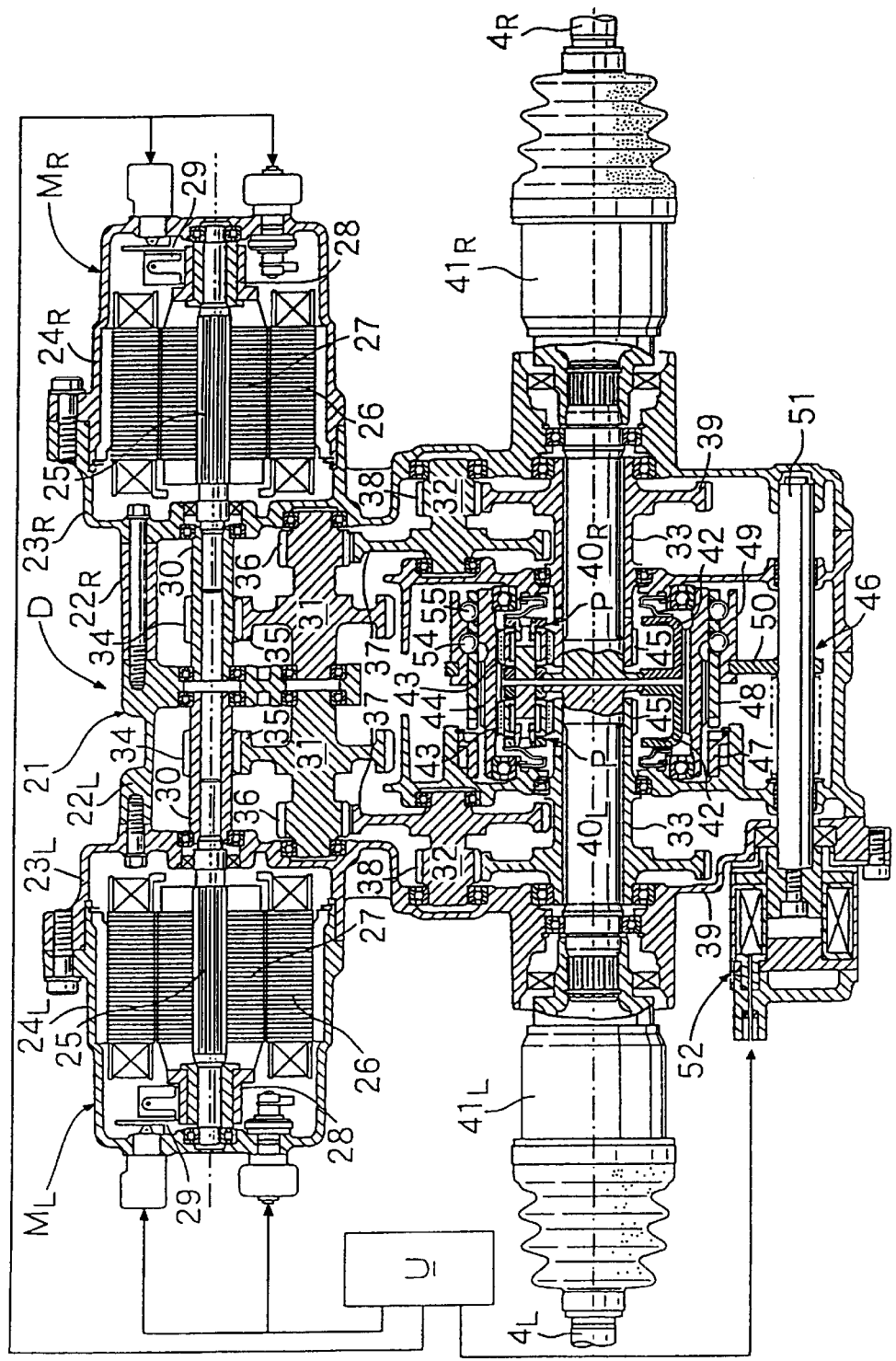
FIG. 2 is an enlarged sectional view of a rear-wheel drive unit.
Figure 3:
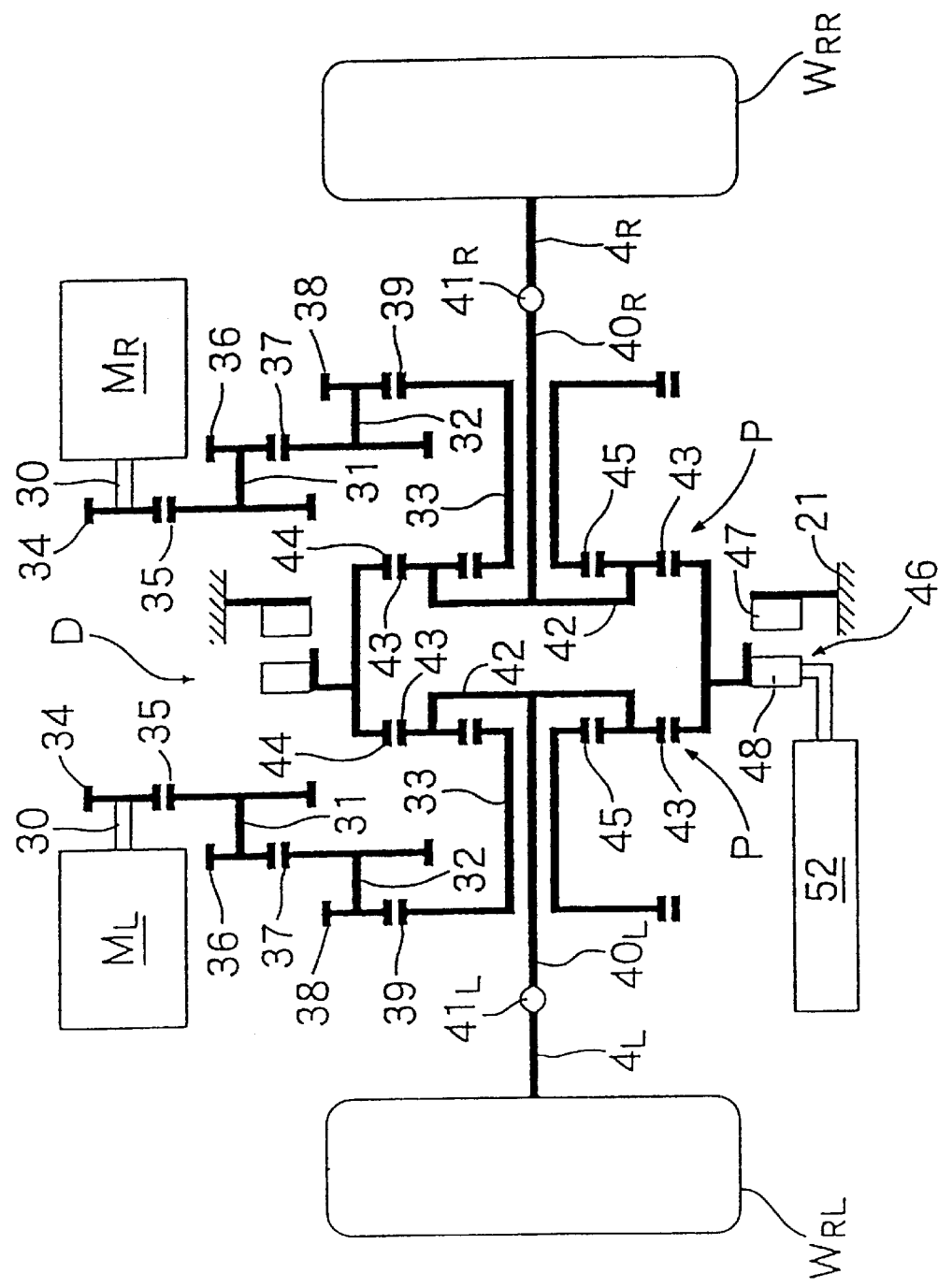
FIG. 3 is a skeleton diagram of the rear-wheel drive unit.
Figure 4:
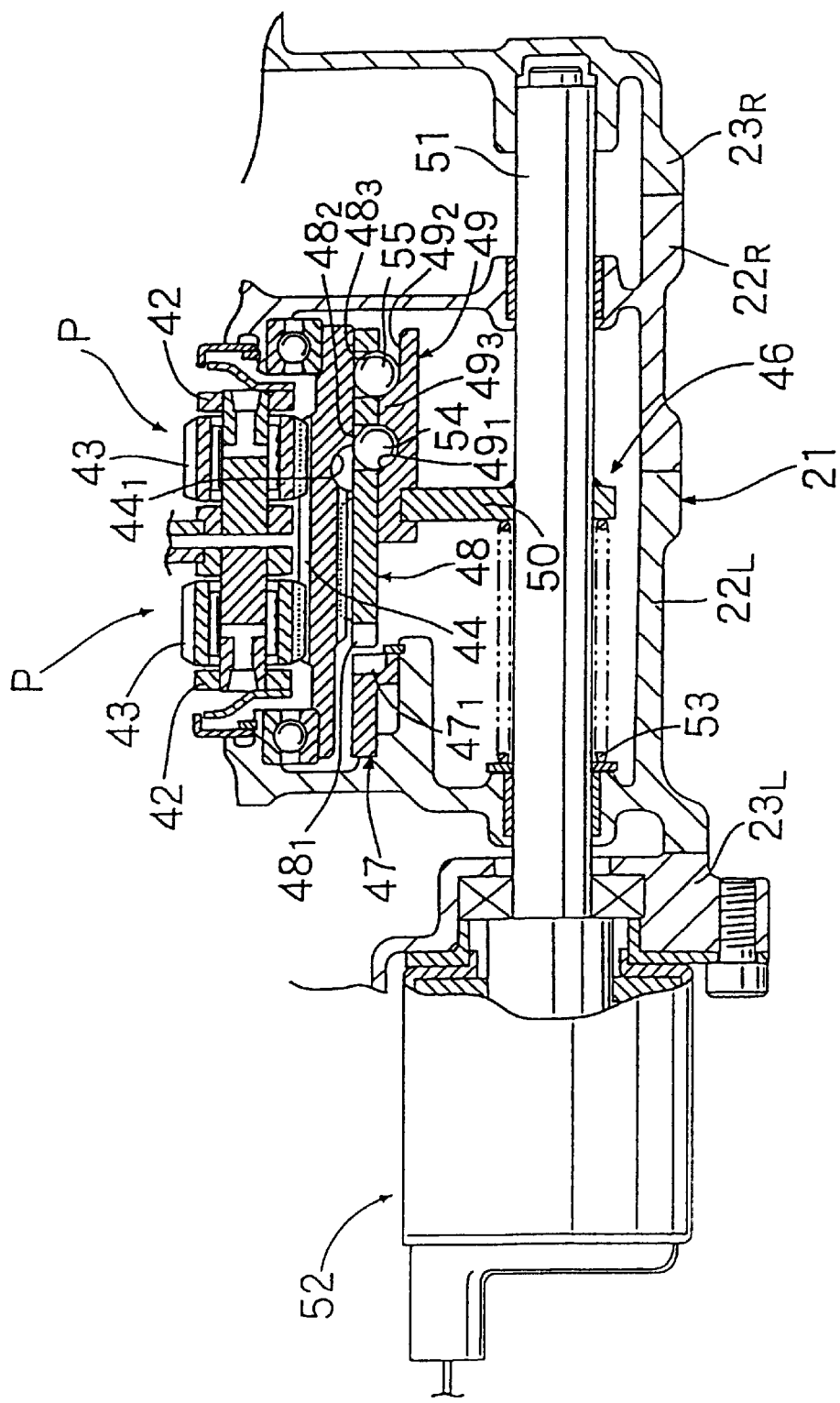
FIG. 4 is a diagram showing the structure of a dog clutch or an enlarged view of the principal part of FIG. 2.
Figure 5:
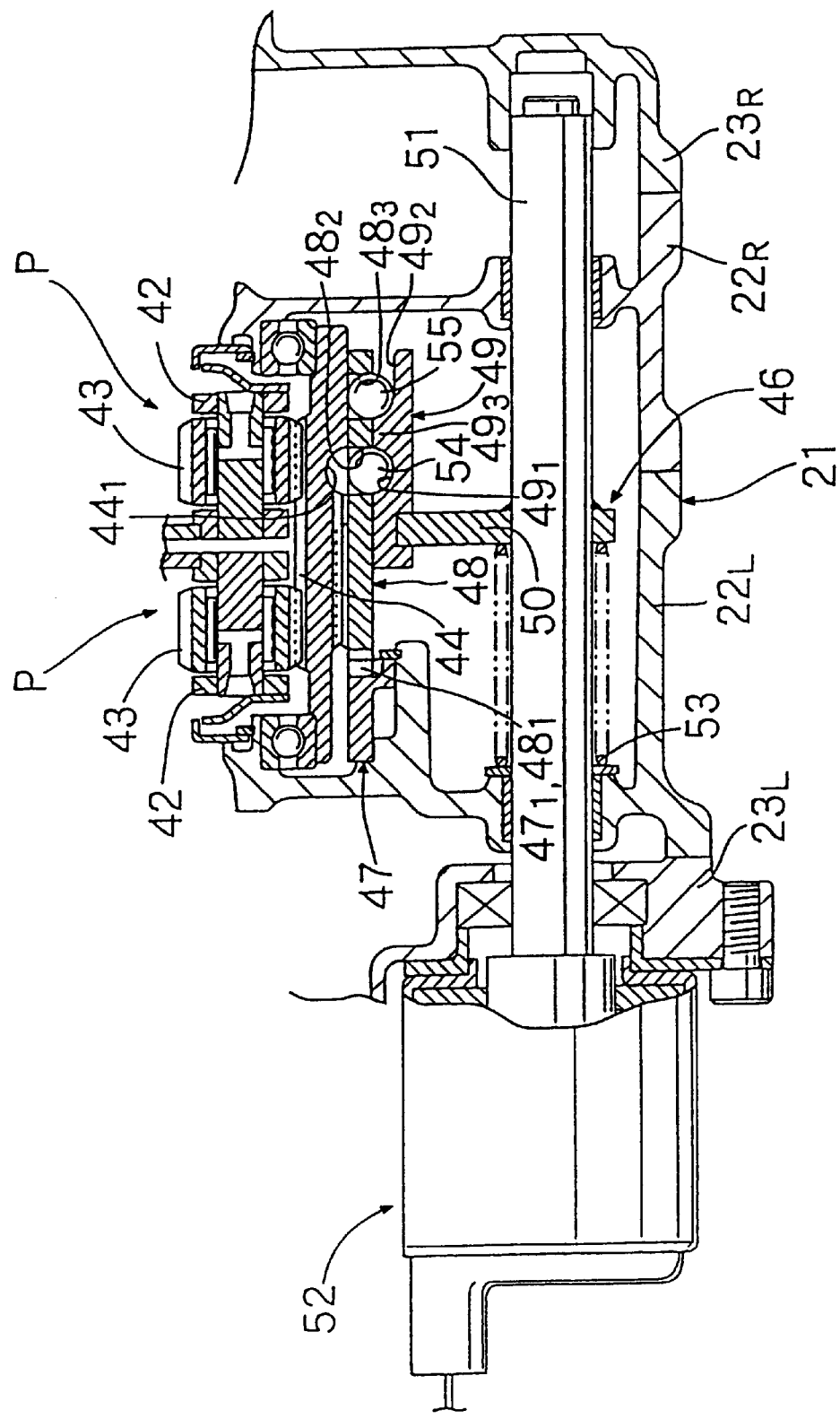
FIG. 5 is an explanatory diagram of actions corresponding to FIG. 4.
Figure 6:
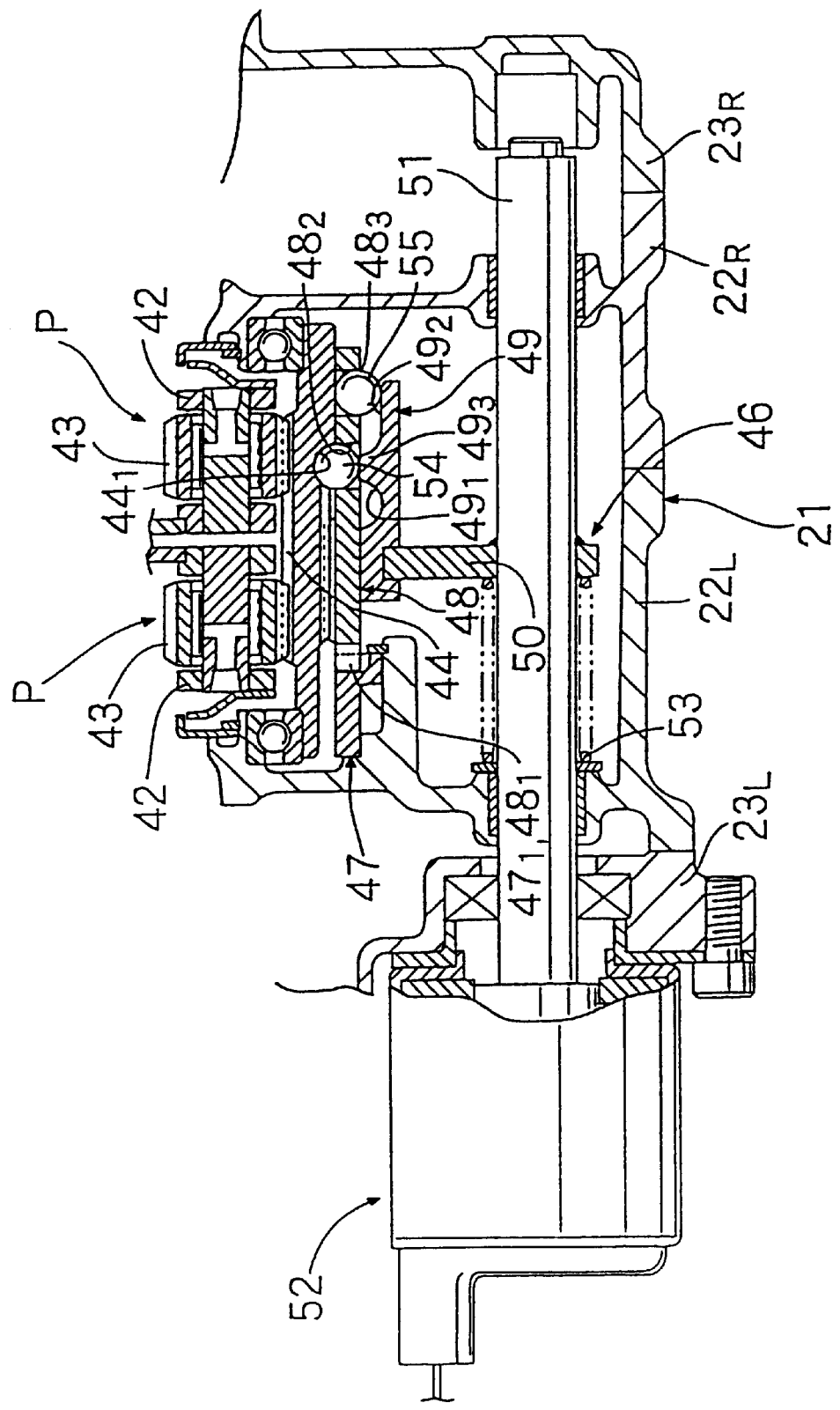
FIG. 6 is an explanatory diagram of actions corresponding to FIG. 4.
Figure 7A:
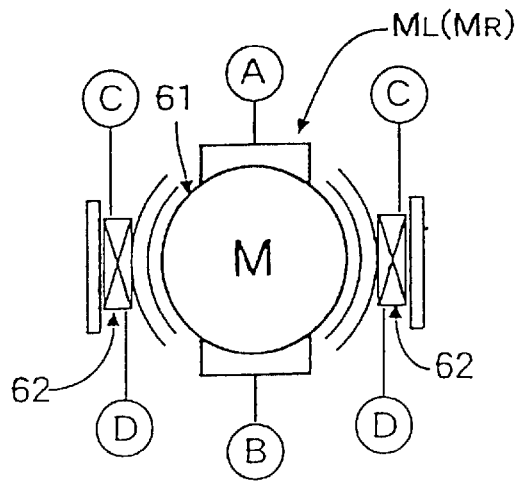
FIGS. 7A to 7C are diagrams showing an armature and a field current control circuit of a motor.
Figure 7B:
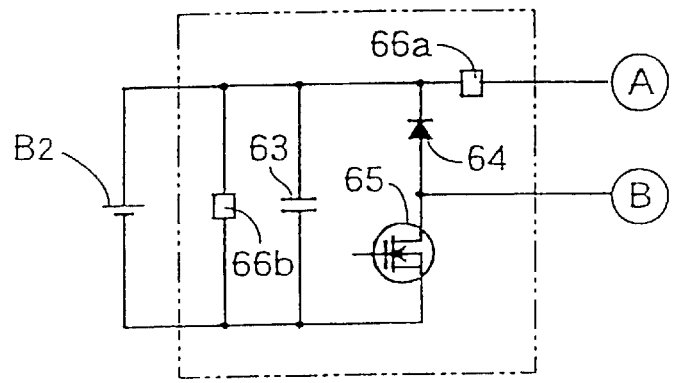
Figure 7C:
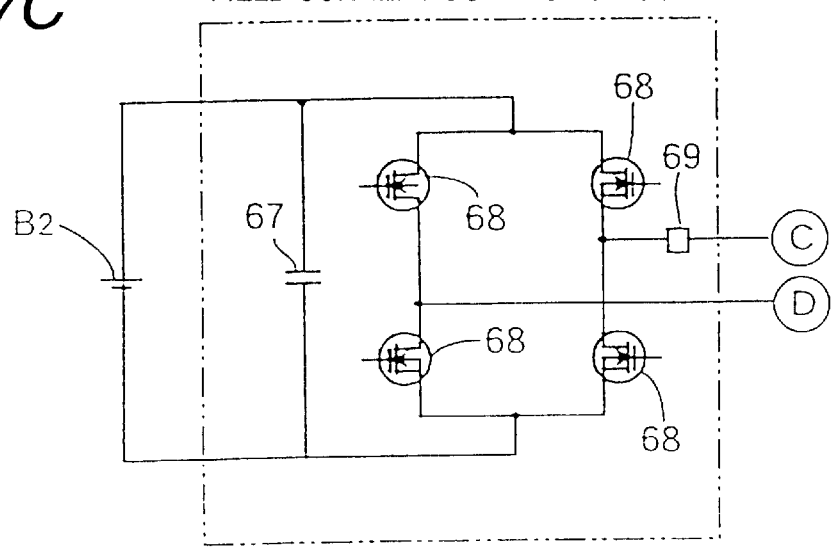
Figure 8:
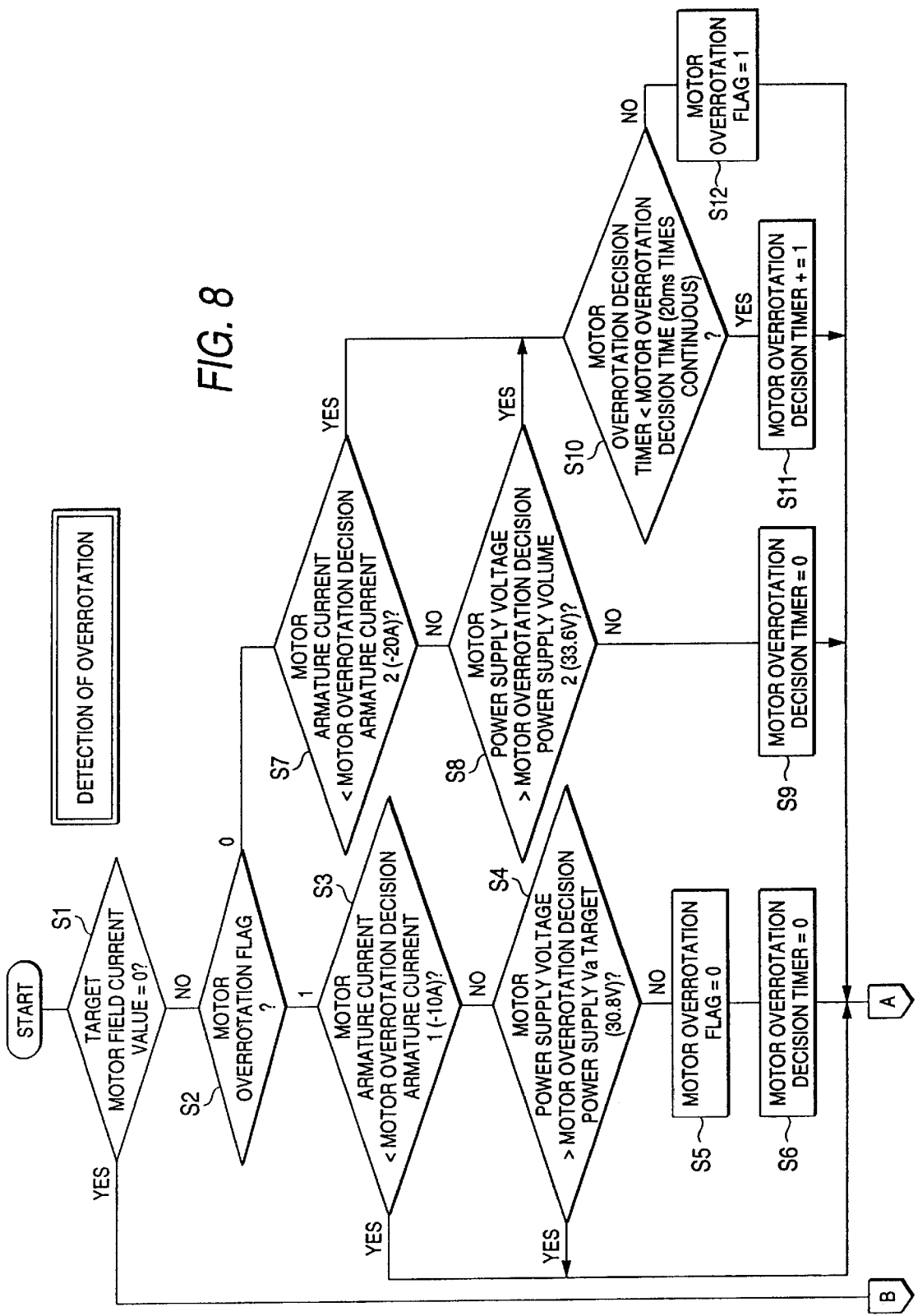
FIG. 8 is a first part of flowchart of a control routine for weakening the field current of the motor.
Figure 9:
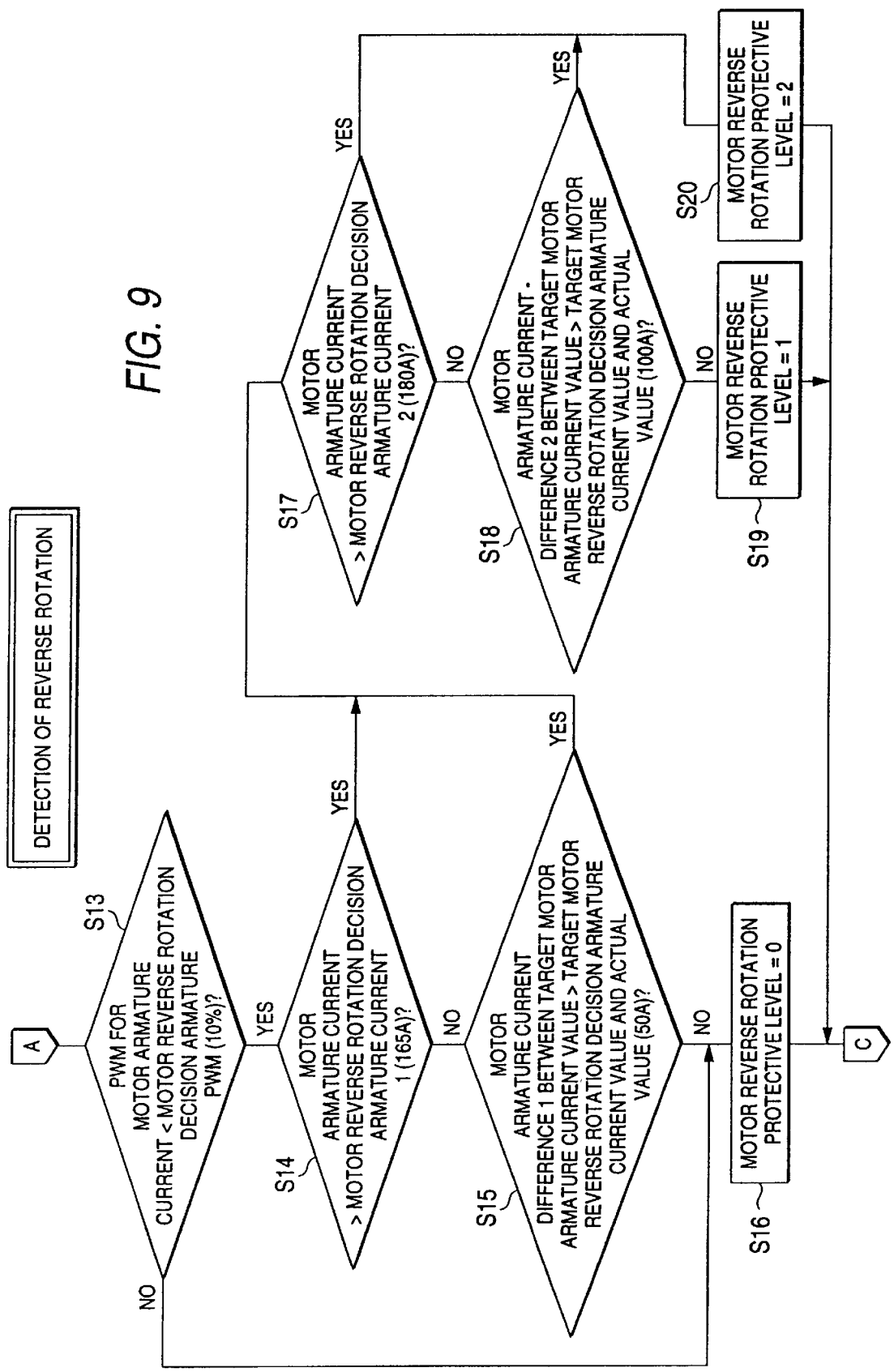
FIG. 9 is a second part of flowchart of the control routine for weakening the field current of the motor.
Figure 10:
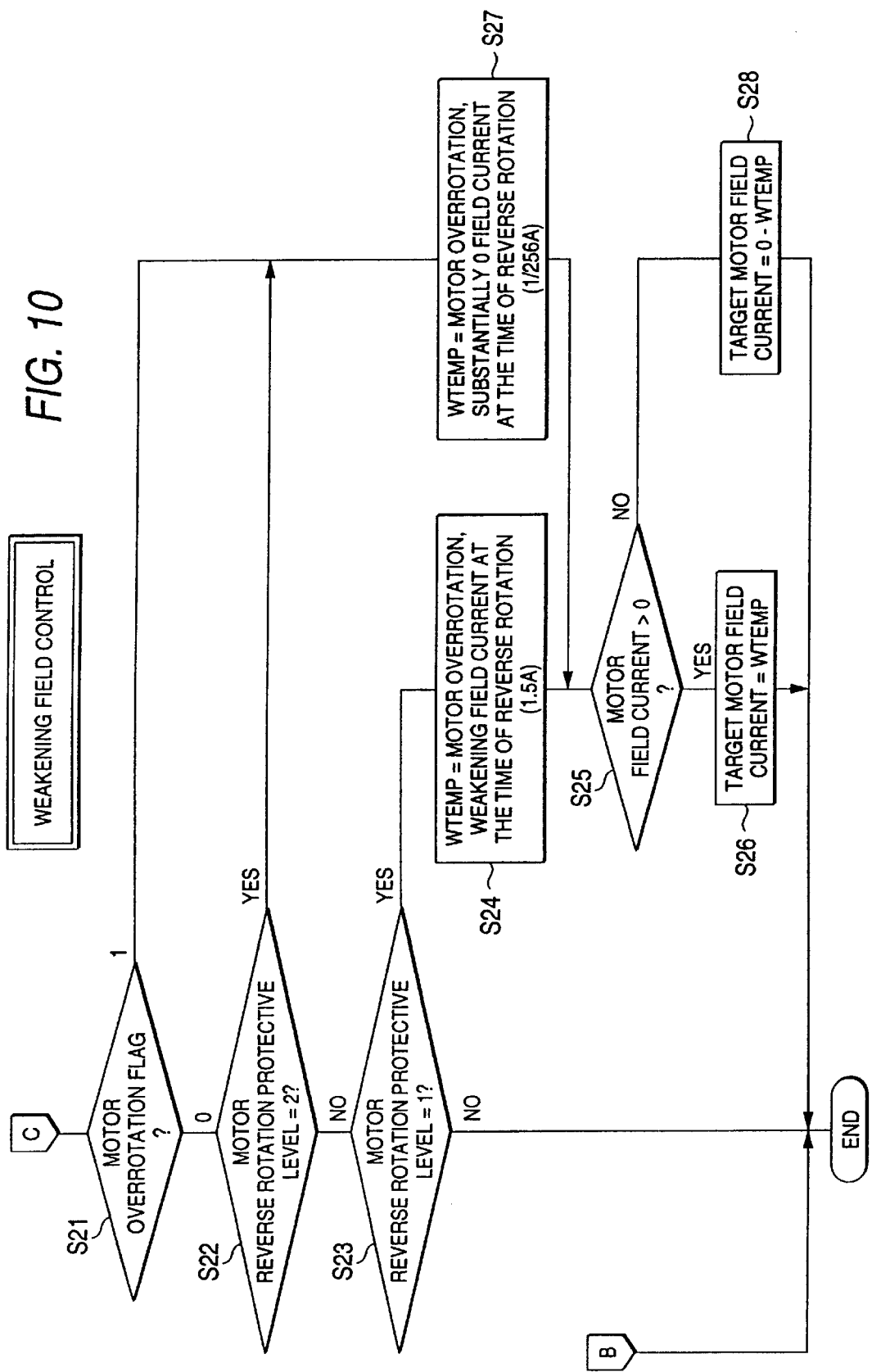
FIG. 10 is a third part of flowchart of the control routine for weakening the field current of the motor.
Figure 11:
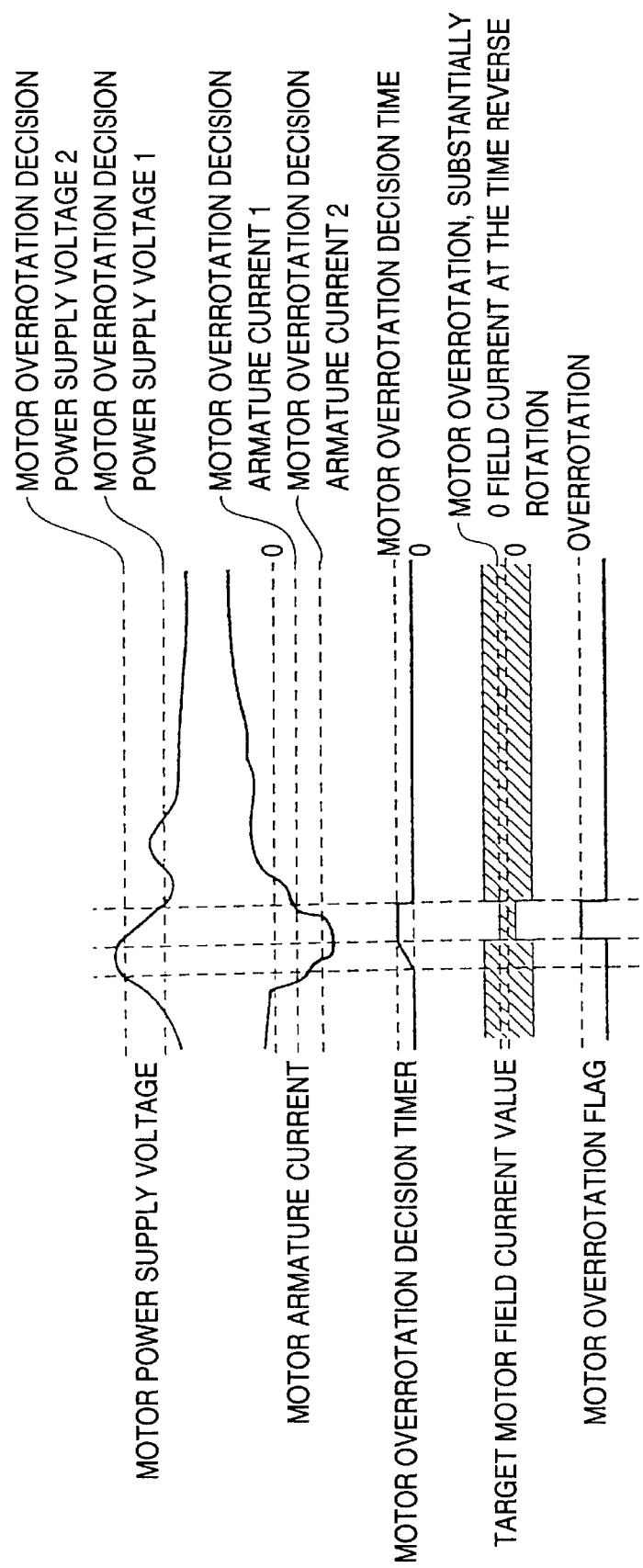
FIG. 11 is a time chart illustrating the action of the motor at the time of its overrotation.
Figure 12:
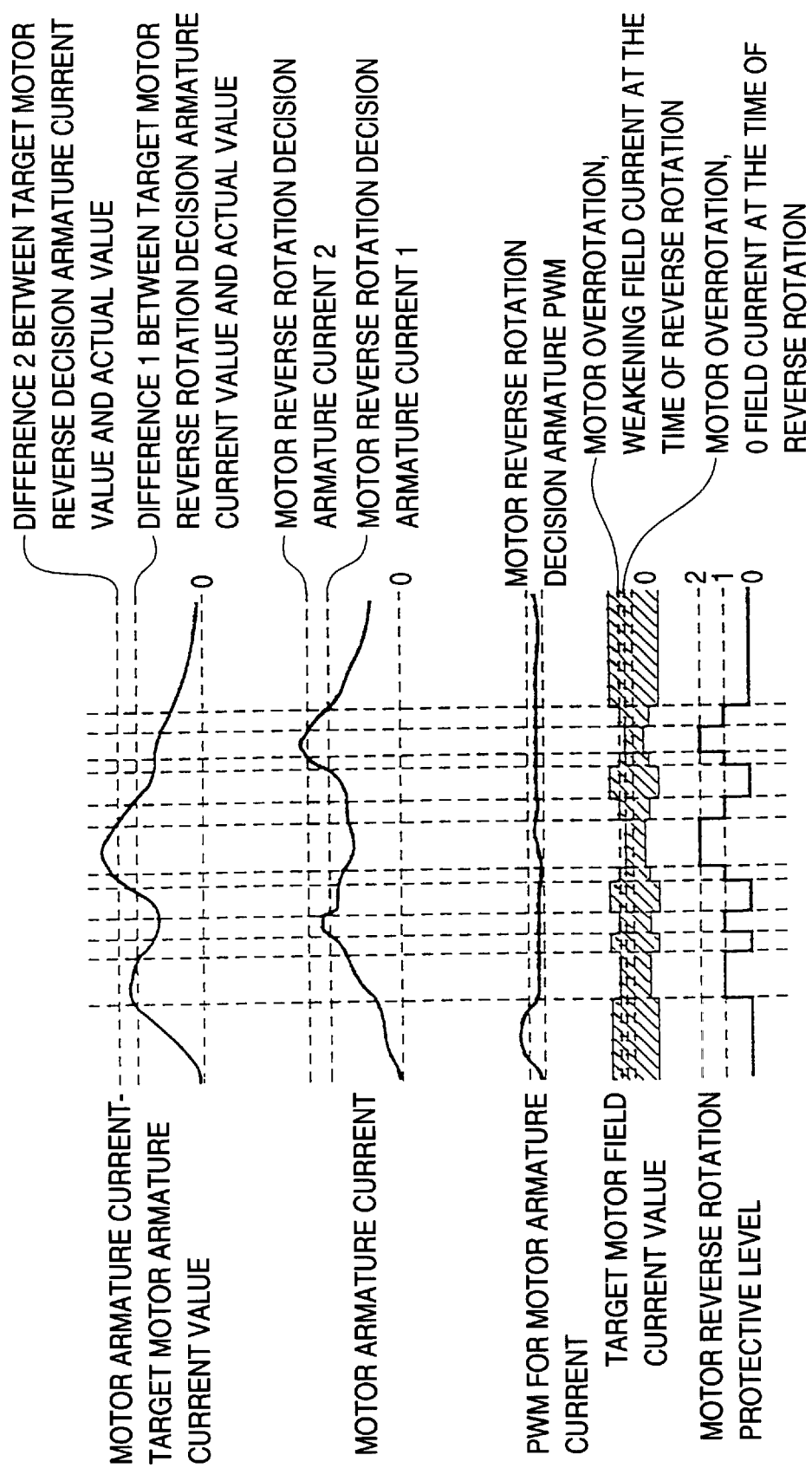
FIG. 12 is a time chart illustrating the action of the motor at the time of its reverse rotation.

FIGS. 1 to 12 show an embodiment of the invention: FIG. 1 is a diagram illustrating the overall construction of a front-and-rear wheel drive vehicle; FIG. 2 is an enlarged sectional view of a rear-wheel drive unit; FIG. 3 is a skeleton diagram of the rear-wheel drive unit; FIG. 4 is a diagram showing the structure of a dog clutch or an enlarged view of the principal part of FIG. 2; FIGS. 5 and 6 are diagrams explanatory of actions corresponding to FIG. 4; FIGS. 7A to 7C are diagrams showing an armature and a field current control circuit of a motor; FIG. 8 is a first part of flowchart of a control routine for weakening the field current of the motor; FIG. 9 is a second part of flowchart of the control routine for weakening the field current of the motor; FIG. 10 is a third part of flowchart of the control routine for weakening the field current of the motor; FIG. 11 is a time chart illustrating the action of the motor at the time of its overrotation; and FIG. 12 is a time chart illustrating the action of the motor at the time of its reverse rotation.

First, the overall construction a front-and-rear wheel drive vehicle V according to this embodiment of the invention will be described with reference to FIG. 1.

The vehicle V is equipped with an engine E laterally mounted in the front portion of its vehicle body. The driving force of the engine E is transmitted to left-hand and right-hand wheels WFL and WFR via a transmission 1, a differential gear 2 and left-hand and right-hand drive shafts 3L and 3R. A generator G driven by the engine E is connected to a 12-volt first battery B1 for feeding power to various electric appliances such as headlights, brake lamps, an air-conditioning unit and audio equipment.

A rear wheel drive unit D with a pair of DC motors ML and MR as drive sources is provided in the rear portion of the vehicle body. The driving force of these motors ML and MR is transmitted to left-hand and right-hand rear wheels WRL and WRR via left-hand and right-hand drive shafts 4L and 4R. Two 12-volt second batteries B2 and B2 are connected in series and the generator G is connected to these second batteries B2 and B2 via a DC-DC converter C. The actuation of the motors ML and MR is controlled by an electronic control unit U including a microcomputer.

In order to control the driving of the motors ML and MR, the electronic control unit U receives signals from front wheel speed sensors S1 and S1 for detecting the rotational speed of the front wheels WFL and WFR, rear wheel speed sensors S2 and S2 for detecting the rotational speed of the left-hand and right-hand rear wheels WRL and WRR, a steering angle sensor S3 for detecting the steering angle of a steering wheel 6, a brake operation sensor S4 for detecting the operation of a brake pedal 7, a shift position sensor S5 for detecting whether a select lever 8 is in a forward or a backward movement position, and current sensors S6 and S6 for detecting current flowing into the motors ML and MR.

The structure of the rear wheel drive unit D and the motors ML and MR will now be described with reference to FIGS. 2 and 3.

The casing 21 of the rear wheel drive unit D includes a left-hand and a right-hand case body 22L and 22R mutually coupled together, a left-hand case cover 23L coupled to the left side of the light case body 22L, and a right-hand case cover 23R coupled to the right side of the right-hand case body 22R. The motor housing 24L of the left-hand motor ML is fixed to the left side of the left-hand case cover 23L, and the motor housing 24R of the right-hand motor MR is fixed to the right side of the right-hand case cover 23R. The motors ML and MR respectively are provided with motor shafts 25 and 25 rotatably supported by the left-hand and right-hand case covers 23L and 23R and the motor housings 24L and 24R, stators 26 and 26 fixed to the inner peripheral faces of the motor housings 24L and 24R, rotors 27 and 27 fixed to the motor shafts 25 and 25, commutators 28 and 28 fixed to the motor shafts 25 and 25, and brushes 29 and 29 abutting against the commutators 28 and 28.

Input shafts 30 and 30, first reduction shafts 31 and 31, second reduction shafts 32 and 32, and third reduction shafts 33 and 33 are supported in parallel to one another between the left-hand case body 22L and the left-hand case cover 23L and between the right-hand case body 22R and the right-hand case cover 23R, respectively. The motor shafts 25 and 25 are joined to the respective inner peripheral faces of the cylindrical input shafts 30 and 30 by way of a spline joint. First reduction gears 34 and 34 provided to the input shafts 30 and 30 engage with second reduction gears 35 and 35 provided to the first reduction shafts 31 and 31. Third reduction gears 36 and 36 provided to the first reduction shafts 31 and 31 engage with fourth reduction gears 37 and 37 provided to the second reduction shafts 32 and 32. Further, fifth reduction gears 38 and 38 provided to the second reduction shafts 32 and 32 engage with sixth reduction gears 39 and 39 provided to the third reduction shafts 33 and 33. Consequently, the torque of the motor shafts 25 and 25 is transmitted to the third reduction shafts 33 and 33 via the first to sixth reduction gears 34 to 39 and 34 to 39.

A left-hand and a right-hand output shaft 40L and 40R are relatively rotatably fitted into the respective left-hand and right-hand cylindrical reduction shafts 33 and 33. The external ends of the output shafts 40L and 40R are projected outward from the third reduction shafts 33 and 33 and supported by the respective left-hand and right-hand case covers 23L and 23R. The external ends of the output shafts 40L and 40R are also connected to the respective left-hand and right-hand rear wheels WRL and WRR via equal velocity joints 41L and 41R and the drive shafts 4L and 4R.

The left-hand and right-hand third reduction shafts 33 and 33 and the left-hand and right-hand output shafts 40L and 40R are connected together by planetary gear mechanisms P and P, respectively. The left-hand and right-hand planetary gear mechanisms P and P are substantially similar in structure.

The planetary gear mechanisms P and P include planetary carriers 42 and 42 integrally provided at the inner ends of the output shafts 40L and 40R, a plurality of planetary gears 43 . . . rotatably supported by the planetary carriers 42 and 42, a ring gear 44 rotatably supported by the left-hand and right-hand case bodies 22L and 22R and engaging with the planetary gears 43 . . . , and sun gears 45 and 45 provided to the third reduction shafts 33 and 33 and engaging with the planetary gears 43 . . . In this case, the ring gear 44 of the left-hand and right-hand planetary gear mechanisms P and P is formed integrally planetary gear mechanisms P and P and commonly owned thereby.

As shown in FIG. 4, the ring gear 44 commonly owned by the left-hand and right-hand planetary gear mechanisms P and P may be coupled by a dog clutch 46 to the casing 21. The dog clutch 46 includes: a fixed dog 47 fixed to the left-hand case body 22L; a movable dog 48 axially slidably formed on the outer periphery of the ring gear 43 by way of spline engagement and having tog teeth $48_1$ capable of engaging with the dog teeth $47_1$ of the fixed dog 47; a shift sleeve 49 axially slidably fitted to the outer periphery of the movable dog 48; a shift fork 50 engaging with the shift sleeve 49, a shift rod 51 slidably supported by the casing 21 and used for supporting the shift fork 50; a shift solenoid 52 driving a shift rod 51 to the left in the drawing by being excited; and a return spring 53 for driving the shift rod 51 to the right in the drawing when the shift solenoid 52 is not excited.

Two through-holes $48_2$ and $48_3$ for respectively containing lock balls 54 and 55 are formed in the movable dog 48, and one recessed portion $44_1$ is formed in the outer peripheral face of the ring gear 44 facing the movable dog 48. Moreover, two recessed portions $49_1$ and $49_2$ are formed in the inner peripheral face of the shift sleeve 49 facing the movable dog 48.

As shown in FIG. 4, further, while the shift rod 51 is moving to the right during the time the shift solenoid 52 is not excited, the two through-holes $48_2$ and $48_3$ of the movable dog 48 and the two recessed portion $49_1$ and $49_2$ of the shift sleeve 49 are lined up and the two lock balls 54 and 55 urged outward in a radial direction by centrifugal force are fitted therein. In this condition, the lock balls 54 and 55 are not engaging with the recessed portion $44_1$ of the ring gear 44, whereby the ring gear 44 is allowed to rotate freely.

As shown in FIG. 5, the shift rod 51 causes the movable dog 48 to move to the left via the shift fork 50, the shift sleeve 49 and the lock balls 54 and 55 when the shift solenoid 52 is excited to move the shift rod 51 to the left in the drawing and then the dog teeth $48_1$ of the movable dog 48 engages with the dog teeth $47_1$ of the fixed dog 47. When the shift rod 51 is moved to the left further by the shift solenoid 52 as shown in FIG. 6, one of the lock balls 54 runs onto the protrusion $49_3$ formed between the two recessed portions $49_1$ and $49_2$ of the shift sleeve 49. Then part of the lock ball 54 forced out of the through-hole $48_2$ of the movable dog 48 engages with the recessed portion $44_1$ of the ring gear 44. Consequently, the ring gear 44 is unrotatably coupled to the left-hand case body 22L via the movable dog 48 and the fixed dog 47.

With the rear wheel drive unit D thus constructed, start assisting control is performed when the vehicle V is started and turn assisting control as well as differential limit control is performed after the vehicle V is started.

(1) Start Assisting Control

When the vehicle V is started with the fact that the non-operating condition of the brake pedal 7 has been detected by the brake operation sensor S4; the shift position detected by the shift position sensor S5 is in the forward travel position; and the rear wheel speed Vr (i.e., the vehicle speed) detected by the rear wheel speed sensors S2 and S2 is lower than 15 km/h, the front wheel speed Vf detected by the front wheel speed sensors S1 and S1 is compared with the rear wheel speed Vr detected by the rear wheel speed sensors S2 and S2. When the deviation ΔV of the front wheel speed Vf from the rear wheel speed Vr (=Vf−Vr) comes to a threshold value ΔV or greater, that is, when the slip quantity of the front wheels WFL and WFR driven by the engine E comes to a predetermined value or greater, the left-hand and right-hand motors ML and MR are driven to rotate forward at the same speed while the ring gear 44 of the planetary gear mechanisms P and P is fixed to the casing 21 via the dog clutch 46 by exciting the shift solenoid 52.

Accordingly the torque of the left-hand and right-hand motors ML and MR is transmitted to the sun gears 45 and 45 of the planetary gear mechanisms P and P. However, since the ring gear 44 is fixed by the dog clutch 46 to the casing 21, the sun gears 45 and 45 and the planetary gears 43 . . . engaging with the ring gear 44 revolve while rotating, whereby the left-hand and right-hand planetary carriers 42 and 42 supporting the planetary gears 43 . . . rotate. Consequently, the left-hand and right-hand rear wheels WRL and WRR connected to the planetary carriers 42 and 42 via the output shafts 40L and 40R, the equal velocity joints 41L and 41R and the drive shafts 4L and 4R rotate forward at the same speed so as to assist the start of the vehicle V forward.

At the time of starting the vehicle V backward while the shift position detected by the shift position sensor S5 is in a backward travel position, the left-hand and right-hand rear wheels WRL and WRR are rotated backward at the same speed by reversely driving the left-hand and right-hand motors ML and MR to rotate with the dog clutch 46 kept in engagement therewith so as to assist the start of the vehicle V backward.

(2) Turn Assisting Control

When the vehicle speed comes to 15 km/h or higher after the vehicle V is started satisfactorily, the dog clutch 46 is held in the non-engagement condition shown in FIG. 4, so that the ring gear 44 of the planetary gear mechanisms P and P is allowed to freely rotate. When the vehicle V makes a right turn in this condition, the left-hand motor ML is driven to rotate forward, whereas the right-hand motor MR is driven to rotate reversely. Then the left-hand sun gear 45 rotates forward, thus causing the planetary carrier 42 to rotate forward with respect to the ring gear 44, and the right-hand sun gear 45 simultaneously rotates reversely, thus causing the planetary carrier 42 to rotate reversely with respect to the ring gear 44. At this time, the speed of the left-hand rear wheel WRL is increased, whereas that of the right-hand rear wheel WRR is reduced, because two kinds of torque mutually applied from the left-hand and right-hand planetary carriers 42 and 42 to the common ring gear 44 in opposite directions are offset. Consequently, the driving force and braking force individually act on the left-hand and right-hand rear wheels WRL and WRR, and the rightward yaw moment thus generated works to assist the right turn of the vehicle V.

When the vehicle V makes a left turn, the right-hand motor ML is driven to rotate forward, whereas the left-hand motor MR is driven to rotate reversely, whereby the leftward yaw moment is generated and works to assist the left turn of the vehicle V as the driving force and braking force act on the right-hand and left-hand rear wheels WRR and WRL. Moreover, the quantity of driving the left-hand and right-hand motors ML and MR can be determined according to the presumed turning radius of the vehicle V based on the steering angle detected by the steering angle sensor S3 and the vehicle speed detected by the rear wheel speed sensors S2 and S2.

(3) Differential Limit Control

During traveling straight or and high-speed turning, the rear wheel drive unit D is caused to demonstrate the differential limit control function by making the left-hand and right-hand motors ML and MR function as generators so as to generate regenerative braking force. More specifically, the torque of the left-hand rear wheel WRL is transmitted to the left-hand motor ML via the planetary carrier 42, planetary gears 43 . . . and the sun gear 45 and the torque of the right-hand rear wheel WRR is also transmitted to the right-hand motor ML via the planetary carrier 42, planetary gears 43 . . . and the sun gear 45 for braking purposes. However, As the left-hand and right-hand planetary gears 43 . . . are engaging with the common ring gear 44 separated from the casing 21 at this time, a difference in the rotations of the left-hand and right-hand rear wheels WRL and WRR is restricted by the braking force of the left-hand and right-hand motors ML and MR. The differential limit function is thus demonstrated and when the yaw moment acts on the vehicle V because of disturbance and the like, stability of traveling straight on and high-speed turning can be improved by generating an opposing yaw moment against what is acting on the vehicle V.

FIGS. 8 to 10 are flowcharts showing contents of field current control when the overrotation and reverse rotation of the motors ML and MR occur.

The flowchart of FIG. 8 shows the steps of detecting the overrotation of the motors ML and MR, the outline of which will now be described beforehand. When the motors ML and MR are overrotated by the driving force reversely transmitted from the rear wheels WR and WR function as generators, the armature current of the motors ML and MR flows reversely and the voltage of the second batteries B2 and B2 for driving the motors ML and MR rises unusually. Consequently, the overrotation of the motors ML and MR can be detected in accordance with these two phenomena.

First, if the target value of the motor field current is 0 in Step S1, no field current control is performed because no electromotive force is generated even though the motors ML and MR excessively or reversely rotate. If the target value of the motor field current is not 0 in Step S1 and if a motor overrotation flag is set to 0 in Step S2 though the motors ML and MR are not overrotating, the motor armature current detected by the armature current sensor 66a provided in the armature current control circuit is compared with a motor overrotation decision armature current 2 (−20 A) in Step S7. The minus sign of the motor overrotation decision armature current 2 (−20) shows that a case where the motor armature current reversely flows because of the overrotation of the motors ML and MR. Unless the motor armature current is smaller than the motor overrotation decision armature current 2, that is, the reverse motor armature current generated by the overrotation is relatively small, it is decided that the motors ML and MR are not overrotating and Step S8 is followed. In Step S8, a motor power supply voltage as the voltage of the second batteries B2 and B2 detected by the battery voltage sensor 66b provided in the armature current control circuit is compared with a motor overrotation decision power supply voltage 2 (33.6V). Consequently, unless the motor power supply voltage exceeds the motor overrotation decision power supply voltage 2, it is decided that the motors ML and MR are not overrotating and Step S9 is followed. Then a motor overrotation decision timer is set to 0 in Step S9.

On the other hand, if the motor armature current is smaller than the motor overrotation decision armature current 2 in Step S7, that is, if the reverse motor armature current generated by the overrotation is greater, it is decided that the motors ML and MR are overrotating and Step S10 is followed. If the motor power supply voltage exceeds the motor overrotation decision power supply voltage 2 in Step S8, Step S10 is followed. If the time set to the motor overrotation decision timer is shorter than motor overrotation decision time (40 msec) in Step S10, the motor overrotation decision timer is incremented in Step S11. If the time set to the motor overrotation decision timer is the motor overrotation decision time (40 msec) or greater, it is decided that the motors ML and MR are overrotating in Step S12 and the motor overrotation flag is set to 1.

When the motor overrotation flag is set to 1 in Step S2 while the motors ML and MR are overrotating, it is decided that the motors ML and MR are not overrotating if the motor armature current is not smaller than a motor overrotation decision armature current 1 (−10 A) in Step S3 and if the motor power supply voltage does not exceed a motor overrotation decision power supply voltage 1 (30.8V) in Step S4. Further, the motor overrotation flag is set to 0 in Step S5 and the motor overrotation decision timer is set to 0 in Step S5.

The flowchart of FIG. 9 shows the steps of detecting the reverse rotation of the motors ML and MR, the outline of which will now be described beforehand. When the motors ML and MR are reversely rotated by the driving force reversely transmitted from the rear wheels WR and WR function as generators, the armature current of the motors ML and MR under feedback control grows greater than the target value, thus setting PWM for motor armature current closer to 0%, so that the reverse rotation of the motors ML and MR becomes detectable on the basis of the phenomenon above.

First, the PWM for motor armature current is compared with armature PWM for deciding motor reversion (10%) and unless the PWM for motor armature current is less than the armature PWM for deciding motor reversion, it is decided that the motors ML and MR are not reversely rotating so as to set a motor reversion protective level to 0 in Step S16. On condition that the PWM for motor armature current is less than the armature PWM for deciding motor reversion in Step S13; the motor armature current has not exceeded a motor reversion decision armature current 1 (165 A) in subsequent Step S14; and a value resulting from subtracting a target motor armature current value from the motor armature current has not exceeded a difference 1 (50 A) between a target motor reversion decision armature current value and an actual value, it is decided that the motors ML and MR are not reversely rotating and the motor reversion protective level is set to 0.

If the motor armature current exceeds the motor reversion decision armature current 1 in Step S14 or if the value resulting from subtracting the target motor armature current value from the motor armature current exceeds the difference 1 between the target motor reversion decision armature current value and the actual value in Step S15, Step S17 is followed then. On condition that the motor armature current has not exceeded a motor reversion decision armature current 2 (180 A) in Step S17; and the value resulting from subtracting the target motor armature current value from the motor armature current has not exceeded a difference 2 (100 A) between the target motor reversion decision armature current value and the actual value in Step S18, it is decided that the motors ML and MR are weakly reversely rotating and the motor reversion protective level is set to 1 corresponding to the weak reverse rotation.

If the motor armature current exceeds the motor reversion decision armature current 2 in Step S17 or if the value resulting from subtracting the target motor armature current value from the motor armature current exceeds the difference 2 between the target motor reversion decision armature current value and the actual value in Step S18, it is decided that the motors ML and MR is strongly reversely rotating and the motor reversion protective level is set to 2 corresponding to the strong reverse rotation in Step S20.

The flowchart of FIG. 10 shows the steps of weakening the field current of the motors ML and MR when the overrotation or reverse rotation of the motors ML and MR are detected. First, if the motor overrotation flag is set to 1 though the motors ML and MR are overrotating in Step S21 or if the motor reversion protective level is 2 though the motors ML and MR are strongly reversely rotating in Step S22, the field current WTEMP of the motors ML and MR is reduced up to almost nearly 0 field current (1/256 A) at the time the motors are overrotated or reversely rotated in Step S27. If the motor reversion protective level is 1 though the motors ML and MR are weakly reversely rotating in Step S23, the field current WTEMP of the motors ML and MR is reduced up to weak field current (1.5 A) at the time the motors are overrotated or reversely rotated in Step S24.

If the motor field current is positive in Step S25, the field current WTEMP is made a target motor field current value in Step S26 and if the motor field current is negative, the field current WTEMP having a reserved sign thereof is made a target motor field current in Step S28.

FIG. 11 shows an example of action in the form of a time chart when the motors are overrotating; and FIG. 12 is an example of action in a time chart when the motors are reversely rotating.

The armature current and armature voltage can be restrained from being unusually increased by counter electromotive force by controlling the field current of the motors ML and MR so as to weaken the current thereof with the field current control means even when the motors ML and MR are overrotated or reversely rotated. Thus, the armature current control circuit is prevented from being damaged when the overrotation or reverse rotation of the motors ML and MR occurs without particularly raising the dielectric strength and current capacitance of current control elements in the armature current control circuit, whereby an increase in costs can be prevented. Since the overrotation and reverse rotation of the motors ML and MR can be detected without using any special sensor for detecting the number of rotations of motors, an increase in costs can also be prevented.

Although one embodiment of the invention has been described in detail, various changes and modifications may be made in design without departing from the spirit and scope thereof.

The application of the invention is not limited to the motors ML and MR for front-and-rear wheel drive vehicles but motors for use in any other field.

As set forth above, according to the first aspect of this invention, since the field current is reduced when the overrotation and reverse rotation of the motors is detected, the motors are prevented from functioning as generators for generating an excessive current and an excessive voltage, whereby the armature current control circuit of the motors can be prevented from being damaged without particularly increasing the dielectric strength and current capacitance.

According to the second aspect of this invention, since the overrotation of the motors is detected from a rise in the voltage of the battery for feeding power to the motors, the overrotation can be detected exactly without providing a sensor for detecting the number of rotations of the motors.

According to the third aspect of this invention, since the overrotation of the motors is detected from the backward flow of the armature current of the motors, the overrotation can be detected exactly without providing a sensor for detecting the number of rotations of the motors.

According to the fourth aspect of this invention, since the reverse rotation of the motors is detected according to the actually measured value of the armature current or the PWM value of the armature current of the motors, the reverse rotation can be detected exactly without providing a sensor for detecting the number of rotations of the motors.

What is claimed is:

1. A field current control method in a separately excited DC brush motor for controlling a field current and an armature current of said motor comprising a step of reducing said field current when a predetermined rotation of said motor is detected, wherein said field current and said armature current are respectively and independently controlled, wherein said predetermined rotation is an overrotation.

2. The field current control method according to claim 1, further comprising a step of detecting the overrotation according to a rise in a voltage of batteries for feeding power to the motor.

3. The field current control method according to claim 2, comprising a step of deciding the overrotation of said motor according to a comparison between a motor power supply voltage of said batteries and a predetermined value of a power supply voltage.

4. The field current control method according to claim 1, further comprising a step of detecting the overrotation according to a backward flow of said armature current of said motor.

5. The field current control method according to claim 4, comprising a step of deciding the overrotation of said motor according to a comparison between said armature current detected in an armature current control circuit and a predetermined value of a decision armature current.

6. A field current control method in a separately excited DC brush motor for controlling a field current and an armature current of said motor comprising a step of reducing said field current when a predetermined rotation of said motor is detected, wherein said field current and said armature current are respectively and independently controlled, wherein said predetermined rotation is a reverse rotation.

7. The field current control method according to claim 6, further comprising a step of detecting the reverse rotation according to an actual value of said armature current of said motor.

8. The field current control method according to claim 7, comprising a step of deciding the reverse rotation of said motor according to a comparison between said actual value and a predetermined value of an armature current for deciding reverse rotation.

9. The field current control method according to claim 6, further comprising a step of detecting the reverse rotation according to a pulse width modulation value of said armature current of said motor.

10. The field current control method according to claim 9, comprising a step of deciding the reverse rotation of said motor according to a comparison between said PWN of said armature current of said motor and a predetermined PWN for deciding reverse rotation.

* * * * *